US010289583B2

(12) United States Patent
Balakrishnan et al.

(10) Patent No.: US 10,289,583 B2
(45) Date of Patent: May 14, 2019

(54) TECHNIQUES OF EMULATION OF SERIAL PORT OVER USB AT EMBEDDED-SYSTEM DEVICE

(71) Applicant: American Megatrends, Inc., Norcross, GA (US)

(72) Inventors: Venkatesan Balakrishnan, Chennai (IN); Padma Devaraj, Chennai (IN); Anand Krishnan Vadivelu, Trichy (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 335 days.

(21) Appl. No.: 15/255,235

(22) Filed: Sep. 2, 2016

(65) Prior Publication Data
US 2018/0067883 A1  Mar. 8, 2018

(51) Int. Cl.
G06F 13/38 (2006.01)
G06F 13/42 (2006.01)

(52) U.S. Cl.
CPC ........ G06F 13/385 (2013.01); G06F 13/4282 (2013.01)

(58) Field of Classification Search
CPC .......................... G06F 13/385; G06F 13/4282
USPC ....................................................... 710/313
See application file for complete search history.

(56) References Cited

U.S. PATENT DOCUMENTS

| | | | | |
|---|---|---|---|---|
| 7,340,705 B1 * | 3/2008 | Massabki | ............ | G06F 17/5027 716/111 |
| 8,069,257 B1 * | 11/2011 | Bhatia | ................... | G06F 13/105 345/501 |
| 8,532,136 B1 * | 9/2013 | Samuel | ............... | H04L 12/6418 370/461 |
| 2004/0205279 A1 * | 10/2004 | Ohnishi | ................ | G06F 13/385 710/305 |
| 2006/0190238 A1 * | 8/2006 | Autor | ..................... | G06F 13/105 703/25 |
| 2006/0190634 A1 * | 8/2006 | Bennett | ............... | H04M 1/7253 710/15 |
| 2007/0204069 A1 * | 8/2007 | Bhesania | ............... | G06F 13/102 710/8 |
| 2008/0005446 A1 * | 1/2008 | Frantz | ................... | G06F 13/107 710/313 |
| 2009/0204965 A1 * | 8/2009 | Tanaka | .................. | G06F 9/5077 718/1 |
| 2010/0242039 A1 * | 9/2010 | Noguchi | ............... | G06F 13/102 718/1 |
| 2010/0312930 A1 * | 12/2010 | Yamagata | ........... | G06F 13/4045 710/67 |
| 2011/0013223 A1 * | 1/2011 | Nishimura | ............ | G06F 3/1203 358/1.15 |

(Continued)

Primary Examiner — Christopher B Shin
(74) Attorney, Agent, or Firm — Locke Lord LLP; Tim Tingkang Xia, Esq.

(57) ABSTRACT

In an aspect of the disclosure, a method, a computer-readable medium, and an apparatus are provided. The apparatus may be an embedded-system device. The embedded-system device emulates a first serial port at the embedded-system device. The embedded-system device exposes the first serial port to a host of the embedded-system device through a USB connection. The embedded-system device receives first command or data from the host through the first serial port. The embedded-system device processes the first command or data.

20 Claims, 5 Drawing Sheets

(56) References Cited

U.S. PATENT DOCUMENTS

| | | | |
|---|---|---|---|
| 2011/0307369 A1* | 12/2011 | Anguish | G06Q 40/04 705/37 |
| 2014/0280837 A1* | 9/2014 | Ayanam | H04L 41/24 709/223 |
| 2014/0280947 A1* | 9/2014 | Christopher | H04L 41/08 709/226 |
| 2014/0337558 A1* | 11/2014 | Powers | G06F 13/4072 710/313 |
| 2015/0356050 A1* | 12/2015 | Smith | G06F 13/4226 710/313 |
| 2016/0283418 A1* | 9/2016 | Farrow | G06F 13/1673 |
| 2017/0070590 A1* | 3/2017 | Balakrishnan | H04L 67/2852 |
| 2017/0229093 A1* | 8/2017 | Sivertsen | G09G 5/006 |
| 2018/0011715 A1* | 1/2018 | Mataya | G06F 13/385 |
| 2018/0239728 A1* | 8/2018 | Emerson | G06F 13/385 |

* cited by examiner

TECHNIQUES OF EMULATION OF SERIAL PORT OVER USB AT EMBEDDED-SYSTEM DEVICE

BACKGROUND

Field

The present disclosure relates generally to embedded-system devices, and more particularly, to techniques of emulating a serial port over USB at embedded-system device for use of a host computer.

Background

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

The BMC may be considered as an embedded-system device. As embedded systems become more ubiquitous, there is a need to provide access to the BMC through a serial port.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an embedded-system device. The embedded-system device emulates a first serial port at the embedded-system device. The embedded-system device exposes the first serial port to a host of the embedded-system device through a Universal Serial Bus (USB) connection. The embedded-system device receives first command or data from the host through the first serial port. The embedded-system device processes the first command or data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
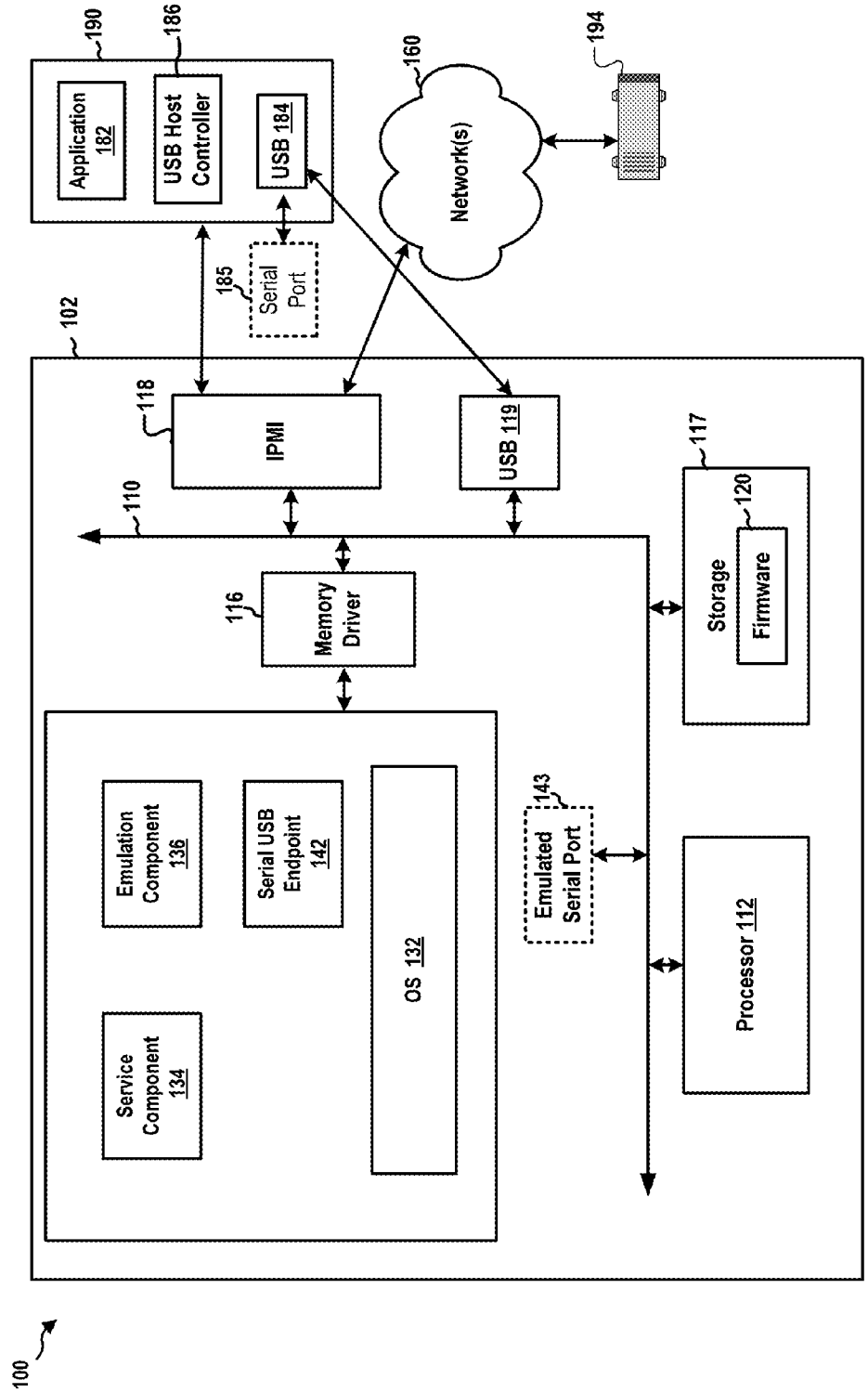
FIG. 1 is a diagram illustrating an embedded-system device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating a BMC 102. The BMC 102 has a processor 112, a memory 114, a memory driver 116, a USB connection component 119, and a storage 117. Further, the BMC 102 may support IPMI and may have an IPMI interface 118. The memory 114, the processor 112, the memory driver 116, the storage 117, the USB connection component 119, and the IPMI interface 118 may be in communication with each other through a communication channel 110 such as a bus architecture. The BMC 102 may be in communication with, through the IPMI interface 118, a host computer 190 and/or a network device 194. The IPMI communication between the BMC and the network device 194 may be carried over a network 160.

The BMC may manage the host computer 190. The host computer 190 has, among other components, a USB connection component 184, a USB host controller 186, and a serial port communication application 182. The BMC 102 may be in communication with the host computer 190 through the USB connection component 119 and the USB connection component 184.

The storage 117 may store BMC firmware 120. When the processor 112 executes the BMC firmware 120, the processor 112 loads code and data of the BMC firmware 120 into the memory 114. This example shows that the BMC firmware 120 provides in the memory 114, among other components, an operating system (OS) 132, a service component 134, and an emulation component 136.

Further, the emulation component 136 may emulate one or more USB endpoints (or devices) connected to the USB connection component 119. For example, the emulation component 136 may emulate a CD drive, a flash drive, a hard drive, etc. connected to the USB connection component 119. In particular, the emulation component 136 may construct an emulated serial USB endpoint 142. As such, from the perspective of the host computer 190, the host computer 190 may perceive that the one or more USB devices or endpoints are connected to the host computer 190 through the USB connection component 184.

In addition, the emulation component 136 can emulate a serial port. In this example, the emulation component 136 creates an emulated serial port 143. The OS 132 may detect the emulated serial port 143 as a physical serial port and may use a driver to access the emulated serial port 143. The emulated serial USB endpoint 142 may also use the driver to access the emulated serial port 143.

The USB host controller 186 may detect the emulated serial USB endpoint 142 (which is emulated by the BMC 102) being connected to the USB connection component 184. Accordingly, the USB host controller 186 may emulate a serial port. In this example, the USB host controller 186 creates an emulated serial port 185. Programs, applications, or components on the host computer 190 may send output through, and receive input from, the emulated serial port 185. Through the operations of the USB host controller 186, the USB connection component 184, the USB connection component 119, and the emulated serial USB endpoint 142, the emulated serial port 185 and the emulated serial port 143 are paired and function as if the two serial ports are connected with each other. In other words, the output from the emulated serial port 185 is the input to the emulated serial port 143. The output from the emulated serial port 143 is the input to the emulated serial port 185. As such, the emulated serial port 143 is exposed to the host computer 190 via the emulated serial port 185 and the USB connections.

Figure 2:
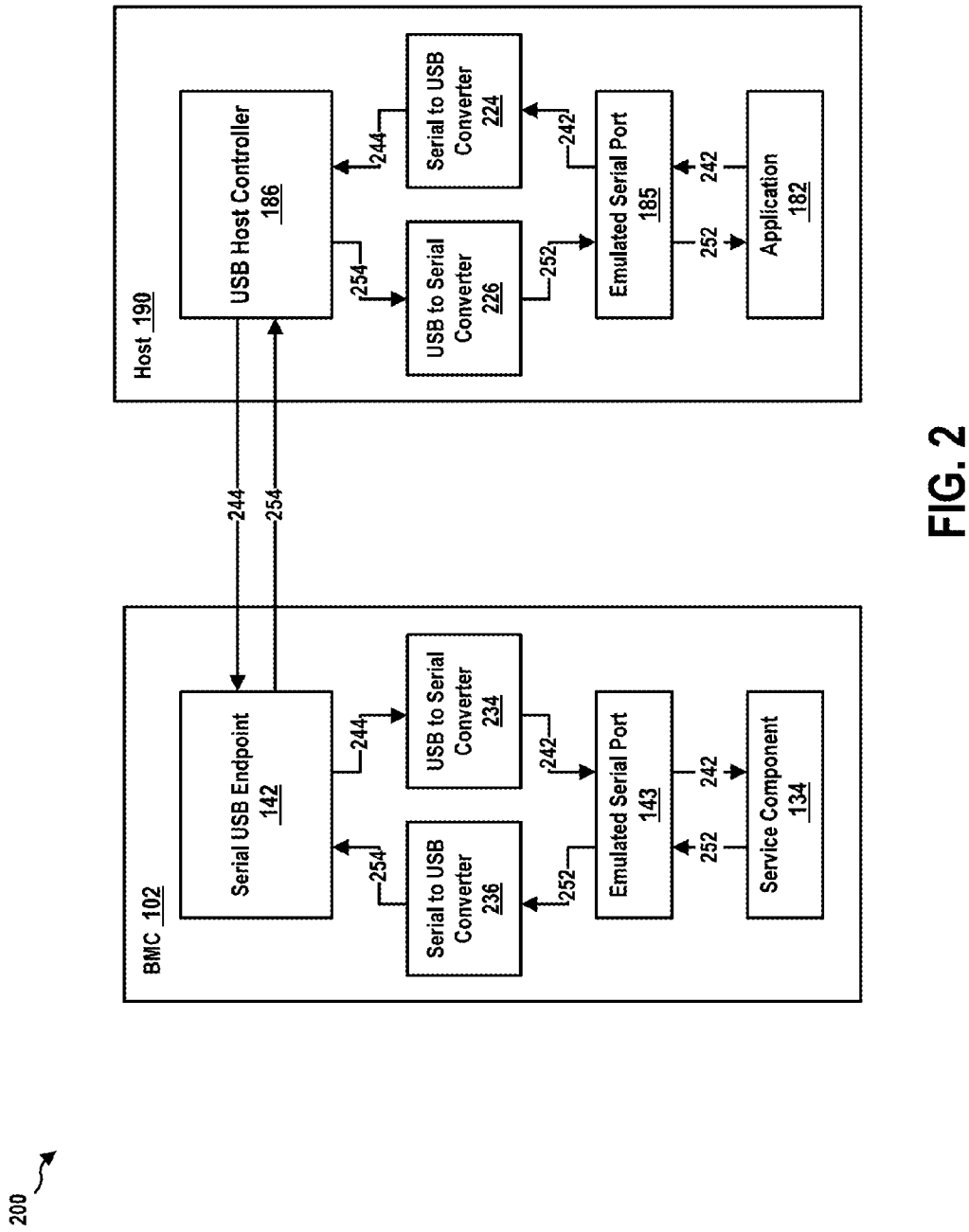
FIG. 2 is a conceptual data flow diagram illustrating the data flow between different means/components in a host and a BMC.

FIG. 2 is a conceptual data flow diagram illustrating the data flow between different means/components in the host computer 190 and the BMC 102. As described supra, the host computer 190 may have a serial port communication application 182 (e.g., PuTTY) that can communicate through a serial port. In particular, in this example, the serial port communication application 182 may output serial commands and/or data 242 to the emulated serial port 185, as if the emulated serial port 185 is a physical serial port, expecting that a device connected to the emulated serial port 185 would be able to process the commands and/or data. The serial port communication application 182 may also monitor the emulated serial port 185, detecting commands and/or data input, if any, from the emulated serial port 185.

The emulated serial port 185 receives the serial commands and/or data 242, and in turn sends the serial commands and/or data 242 to a serial-to-USB converter 224 (which may be provided by the USB host controller 186). The serial-to-USB converter 224 packs the serial commands and/or data 242 into one or more USB packets 244, which are destined to the emulated serial USB endpoint 142. The serial-to-USB converter 224 then sends the USB packets 244 to the USB host controller 186. The USB host controller 186 sends, via the USB connection component 184, the USB packets 244 to the BMC 102.

At the BMC 102, the emulated serial USB endpoint 142 receives, via the USB connection component 119, the USB packets 244. The emulated serial USB endpoint 142 then sends the USB packets 244 to a USB-to-serial converter 234 (which may be provided by the emulation component 136). The USB-to-serial converter 234 receives the USB packets 244 and then extracts the serial commands and/or data 242 from the USB packets 244. The USB-to-serial converter 234 subsequently sends the serial commands and/or data 242 to the emulated serial port 143. The emulated serial port 143 sends the serial commands and/or data 242 to the service component 134.

As described supra, the service component 134 perceives and accesses the emulated serial port 143 as if the emulated serial port 143 is a physical serial port. The service component 134 detects the serial commands and/or data 242 as commands and/or data inputted to the emulated serial port 143. As such, the service component 134 receives the serial commands and/or data 242 as input from a serial port (i.e., the emulated serial port 143) and, accordingly, processes those serial commands and/or data 242.

The service component 134 may generate response commands and/or data 252 and may output the response commands and/or data 252 through the emulated serial port 143. The emulated serial port 143 sends the response commands and/or data 252 to a serial-to-USB converter 236 (which may be provided by the emulation component 136). The serial-to-USB converter 236 packs the response commands and/or data 252 into one or more USB packets 254. The serial-to-USB converter 236 sends the USB packets 254 to the emulated serial USB endpoint 142. The emulated serial USB endpoint 142 accordingly sends, via the USB connection component 119, the USB packets 254 to the host computer 190.

At the host computer 190, USB host controller 186 receives, via the USB connection component 184, the USB packets 254. The USB host controller 186 then sends the USB packets 254 to the USB-to-serial converter 226. The USB-to-serial converter 226 extracts, from the USB packets 254, the response commands and/or data 252. The USB-to-serial converter 226 sends the response commands and/or data 252 to the emulated serial port 185.

As described supra, the serial port communication application 182 monitors the emulated serial port 185 as if the emulated serial port 185 is a physical serial port. Therefore, the serial port communication application 182 detects and receives the response commands and/or data 252 as input from the emulated serial port 185. The serial port communication application 182 then accordingly processes the response commands and/or data.

As an example, the service component 134 executed on the BMC 102 may be a debugging program that takes inputs from a serial port. The serial port communication application 182 on the host computer 190 may send commands and/or data directed to the debugging program through the emulated serial port 185 at the host computer 190. The commands and/or data, as described supra, are packed into USB packets and sent to the BMC 102. The BMC 102 extracts the commands and/or data from the USB packets, and sends the commands and/or data to the service component 134 as input to the emulated serial port 143.

The service component 134 can output a response through the emulated serial port 143. The response, as described supra, are packed into USB packets and sent to the host computer 190. The host computer 190 extracts the response from the USB packets, and sends the response to the serial port communication application 182 as input to the emulated serial port 185.

Figure 3:
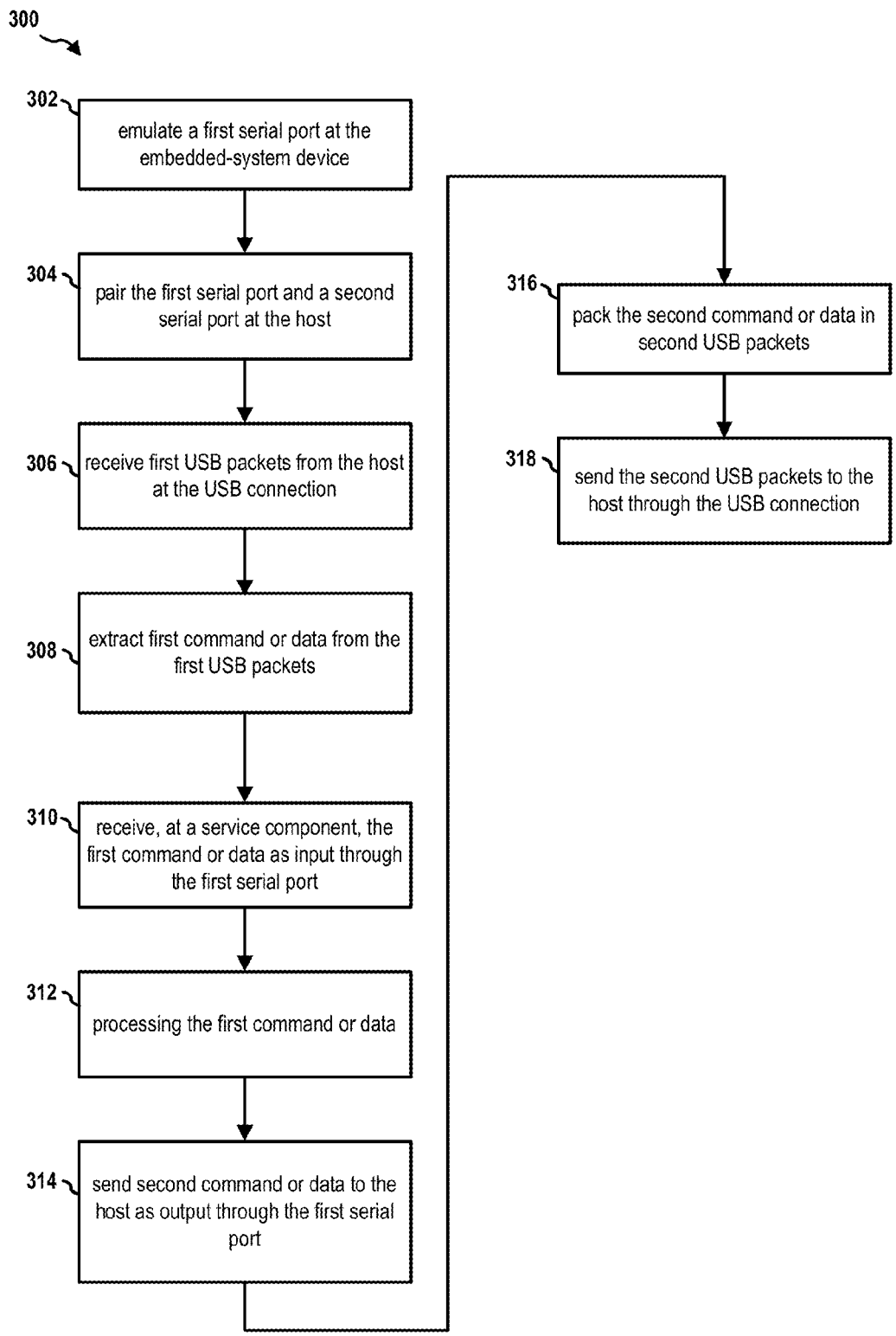
FIG. 3 is a flow chart of a method (process) for emulating a serial port over USB.

FIG. 3 is a flow chart 300 of a method (process) for emulating a serial port over USB. The method may be performed by an embedded-system device (e.g., the BMC 102 and the apparatus 102'). At operation 302, the embedded-system device emulates a first serial port (e.g., the emulated serial port 143) at the embedded-system device. The embedded-system device exposes the first serial port to a host (e.g., the host computer 190) of the embedded-system device through a USB connection (e.g., the USB connection component 119 and the USB connection component 184). More specifically, at operation 304, the embedded-system device pairs the first serial port and a second serial port (e.g., the emulated serial port 185) at the host such that first command or data (e.g., the serial commands and/or data 242) are output from the second serial port to the first serial port as input and second command or data (e.g., the serial commands and/or data 252) are output from the first serial port to the second serial port as input.

In certain configurations, the pairing of the first serial port and the second serial port as implemented through the USB connection. The embedded-system device receives the first command or data from the host through the first serial port. More specifically, at operation 306, the embedded-system device (e.g., via the emulated serial USB endpoint 142) receives first USB packets (e.g., the USB packets 244) from the host at the USB connection. At operation 308, the embedded-system device (e.g., via the USB-to-serial converter 234) extracts the first command or data from the first USB packets.

In certain configurations, the embedded-system device further comprises a service component (e.g., the service component 134) configured to receive inputs from the first serial port. At operation 310, the service component receives the first command or data as input through the first serial port. The first command or data is in a format recognizable by the service component and is processed by the service component.

At operation 312, the embedded-system device (e.g., via the service component 134) processes the first command or data. In certain configurations, the service component is further configured to output to the first serial port. The first command or data is processed to generate the second command or data. At operation 314, the embedded-system device (e.g., via the service component 134) sends the second command or data to the host as output through the first serial port. At operation 316, the embedded-system device (e.g., via the serial-to-USB converter 236) packs the second command or data in second USB packets (e.g., the USB packets 254). At operation 318, the embedded-system device sends the second USB packets to the host through the USB connection.

Figure 4:
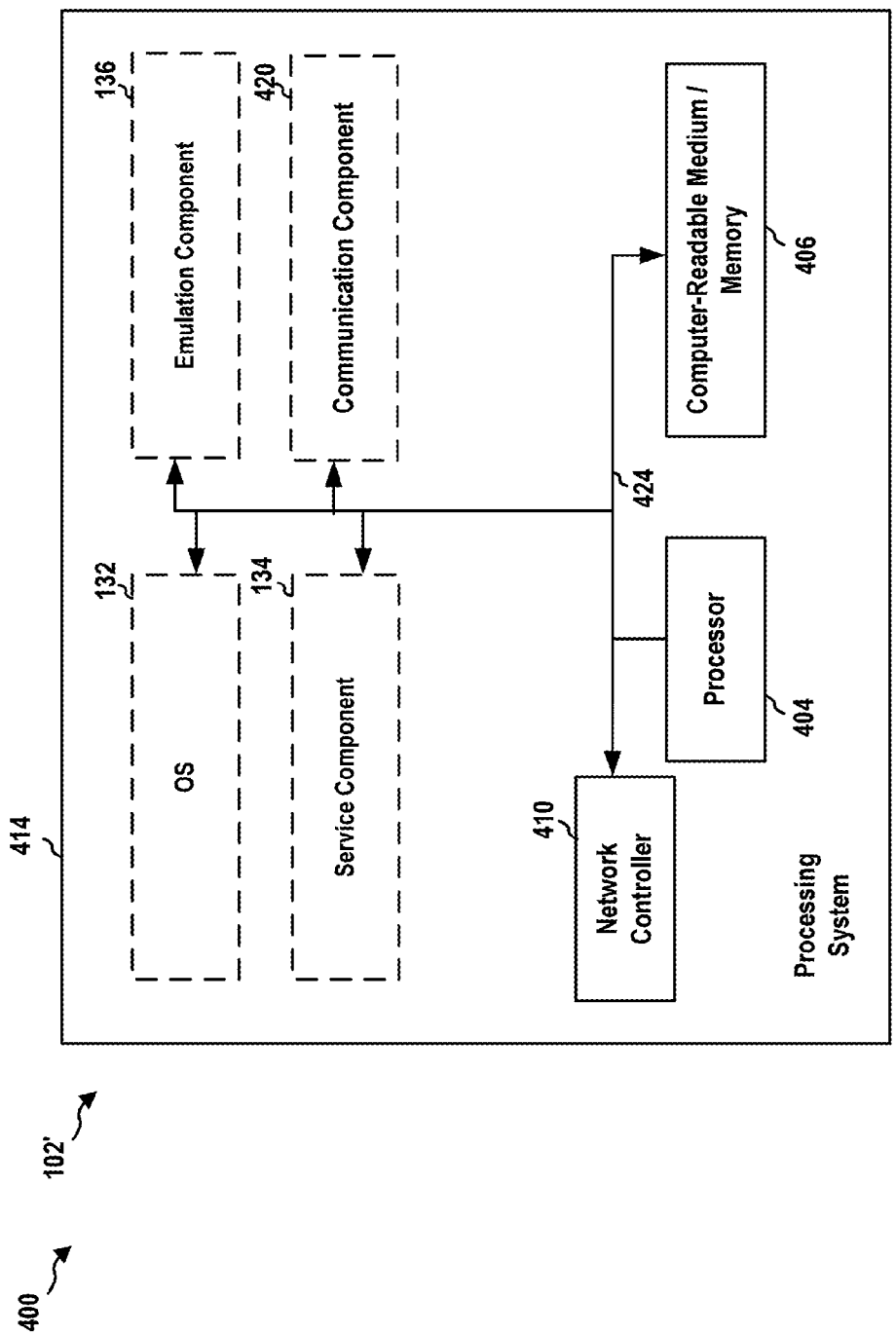
FIG. 4 is a diagram illustrating an example of a hardware implementation for an apparatus employing a processing system.

FIG. 4 is a diagram 400 illustrating an example of a hardware implementation for an apparatus 102' employing a processing system 414. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the OS 132, the emulation component 136, the service component 134, and the computer-readable medium/memory 406. In particular, the computer-readable medium/memory 406 may include the memory 114 and the storage 117. The bus 424 may also link various other circuits such as timing sources, peripherals, voltage regulators, and power management circuits, which are well known in the art, and therefore, will not be described any further.

The processing system 414 may be coupled to a network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 102'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the OS 132, the emulation component 136, the service component 134. The components may be software components running in the processor 404, resident/stored in the computer readable medium/memory 406, one or more hardware components coupled to the processor 404, or some combination thereof.

The apparatus 102' may be configured to include means for performing each of the operations described supra referring to FIG. 3. The aforementioned means may be one or more of the aforementioned components of the apparatus 102 and/or the processing system 414 of the apparatus 102' configured to perform the functions recited by the aforementioned means.

Figure 5:
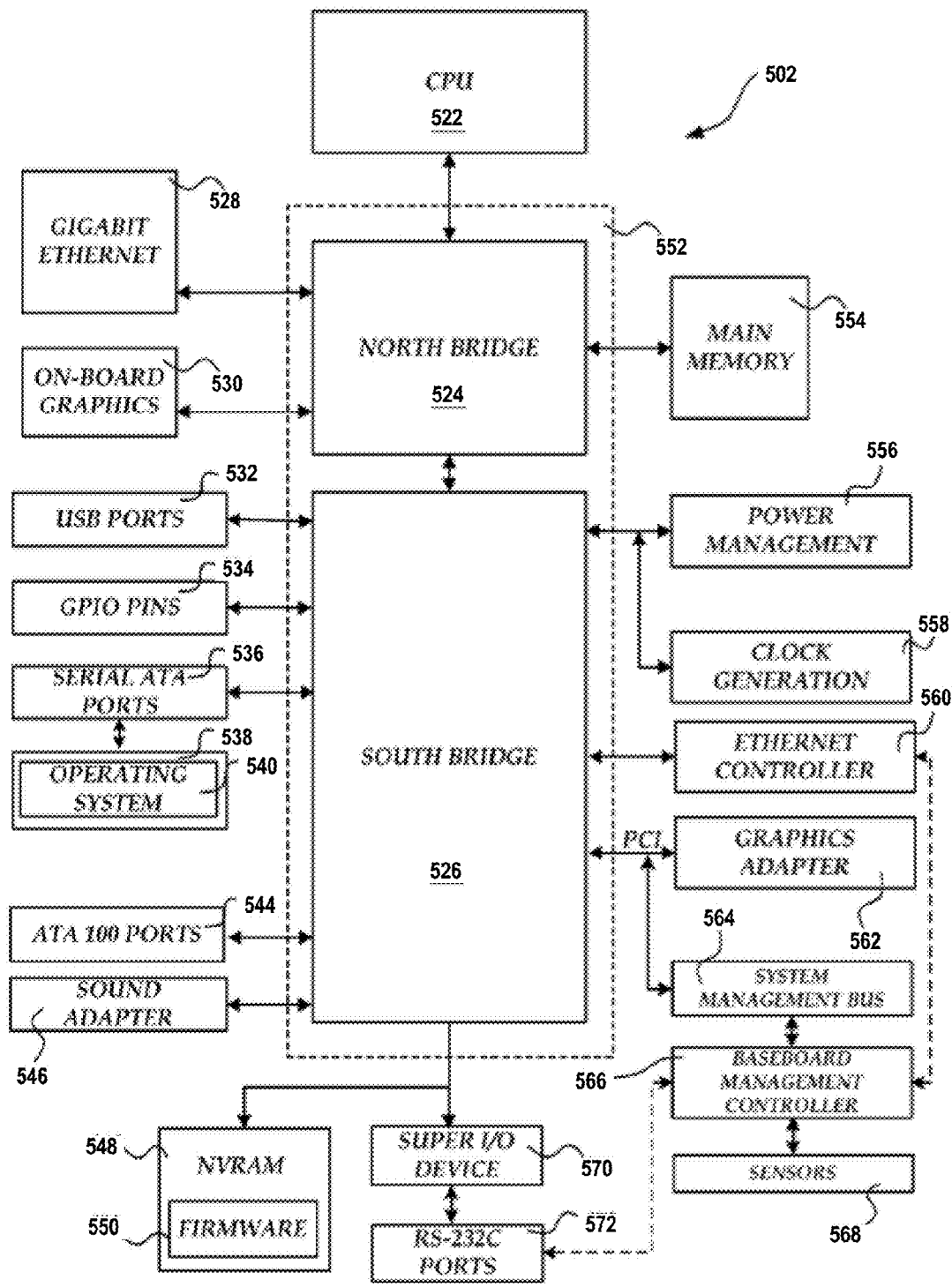
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 190, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating an embedded-system device, comprising:
    emulating a first serial port at the embedded-system device having a processor and a memory coupled to the processor;
    exposing the first serial port to a host of the embedded-system device through a Universal Serial Bus (USB) connection over a communication link between the embedded-system device and the host, wherein the host detects, in accordance with USB standards, the first serial port through a USB endpoint at the embedded-system device and connected to the host through the USB connection;
    receiving first command or data from the host through the first serial port, wherein the first command or data are serial command or data; and
    processing the first command or data.

2. The method of claim 1, wherein the receiving the first command or data further comprises:
    receiving first USB packets from the host at the USB connection; and
    extracting the first command or data from the first USB packets.

3. The method of claim 1, wherein the embedded-system device further comprises a service component configured to receive inputs from the first serial port, the method further comprising:
    receiving, at the service component, the first command or data as input through the first serial port, wherein the first command or data is in a format recognizable by the service component and is processed by the service component.

4. The method of claim 3, wherein the service component is further configured to output to the first serial port, wherein the first command or data is processed to generate second command or data, the method further comprising sending the second command or data to the host as output through the first serial port.

5. The method of claim 4, wherein the sending the second command or data further comprises:
    packing the second command or data in second USB packets; and
    sending the second USB packets to the host through the USB connection.

6. The method of claim 4, wherein the exposing the first serial port to the host comprises:

pairing the first serial port and a second serial port at the host such that the first command or data are output from the second serial port to the first serial port as input and the second command or data are output from the first serial port to the second serial port as input.

7. The method of claim 6, wherein the pairing of the first serial port and the second serial port are implemented through the USB connection.

8. An apparatus, the apparatus being an embedded-system device, comprising:
a memory; and
at least one processor coupled to the memory and configured to:
  emulate a first serial port at the embedded-system device;
  expose the first serial port to a host of the embedded-system device through a Universal Serial Bus (USB) connection over a communication link between the embedded-system device and the host, wherein the host detects, in accordance with USB standards, the first serial port through a USB endpoint at the embedded-system device and connected to the host through the USB connection;
  receive first command or data from the host through the first serial port, wherein the first command or data are serial command or data; and
  process the first command or data.

9. The apparatus of claim 8, wherein to receive the first command or data, the at least one processor is further configured to:
  receive first USB packets from the host at the USB connection; and
  extract the first command or data from the first USB packets.

10. The apparatus of claim 8, wherein the embedded-system device further comprises a service component configured to receive inputs from the first serial port, wherein the at least one processor is further configured to:
  receive, at the service component, the first command or data as input through the first serial port, wherein the first command or data is in a format recognizable by the service component and is processed by the service component.

11. The apparatus of claim 10, wherein the service component is further configured to output to the first serial port, wherein the first command or data is processed to generate second command or data, wherein the at least one processor is further configured to send the second command or data to the host as output through the first serial port.

12. The apparatus of claim 11, wherein to send the second command or data further, the at least one processor is further configured to:
  pack the second command or data in second USB packets; and
  send the second USB packets to the host through the USB connection.

13. The apparatus of claim 11, wherein to exposes the first serial port to the host, the at least one processor is further configured to pair the first serial port and a second serial port at the host such that the first command or data are output from the second serial port to the first serial port as input and the second command or data are output from the first serial port to the second serial port as input.

14. The apparatus of claim 13, wherein the pairing of the first serial port and the second serial port are implemented through the USB connection.

15. A non-transitory computer-readable medium storing computer executable code for operating an embedded-system device, comprising code when loaded in a memory of the embedded-system device that causes a processor of the embedded-system device to:
  emulate a first serial port at the embedded-system device;
  expose the first serial port to a host of the embedded-system device through a Universal Serial Bus (USB) connection over a communication link between the embedded-system device and the host, wherein the host detects, in accordance with USB standards, the first serial port through a USB endpoint at the embedded-system device and connected to the host through the USB connection;
  receive first command or data from the host through the first serial port, wherein the first command or data are serial command or data; and
  process the first command or data.

16. The non-transitory computer-readable medium of claim 15, wherein to receive the first command or data, the code is further configured to:
  receive first USB packets from the host at the USB connection; and
  extract the first command or data from the first USB packets.

17. The non-transitory computer-readable medium of claim 15, wherein the embedded-system device further comprises a service component configured to receive inputs from the first serial port, wherein the code is further configured to:
  receive, at the service component, the first command or data as input through the first serial port, wherein the first command or data is in a format recognizable by the service component and is processed by the service component.

18. The non-transitory computer-readable medium of claim 17, wherein the service component is further configured to output to the first serial port, wherein the first command or data is processed to generate second command or data, wherein the code is further configured to send the second command or data to the host as output through the first serial port.

19. The non-transitory computer-readable medium of claim 18, wherein to send the second command or data further, the code is further configured to:
  pack the second command or data in second USB packets; and
  send the second USB packets to the host through the USB connection.

20. The non-transitory computer-readable medium of claim 18, wherein to exposes the first serial port to the host, the code is further configured to pair the first serial port and a second serial port at the host such that the first command or data are output from the second serial port to the first serial port as input and the second command or data are output from the first serial port to the second serial port as input, wherein the pairing of the first serial port and the second serial port are implemented through the USB connection.

* * * * *